April 29, 1952  J. C. KOONZ  2,594,658
INDUCTION MOTOR CONTROL SWITCH AND CIRCUIT
Filed July 23, 1947  3 Sheets-Sheet 1

Inventor
John C. Koonz
By Clarence J. Loftus, Atty

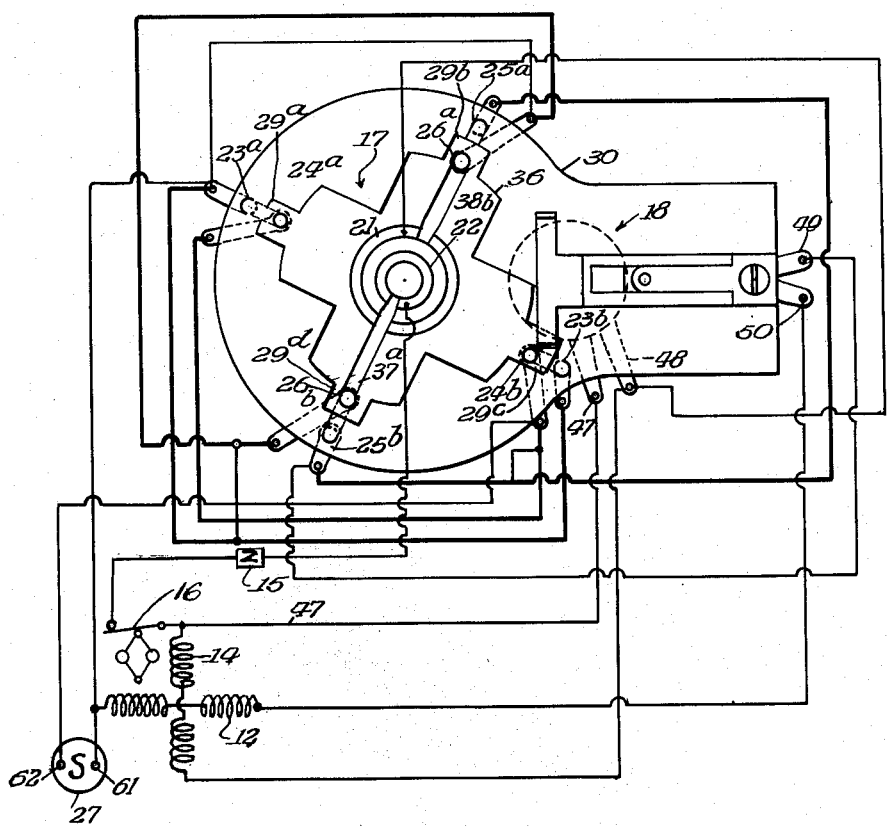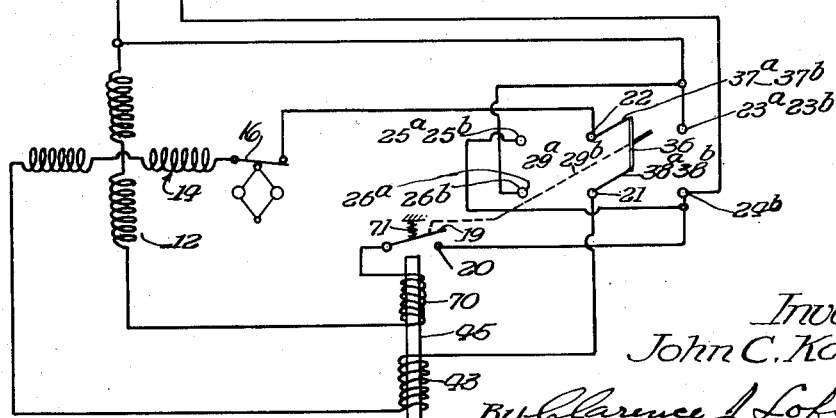

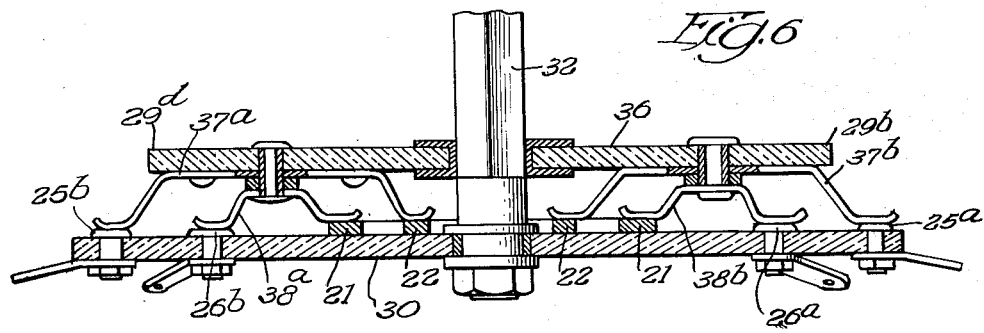
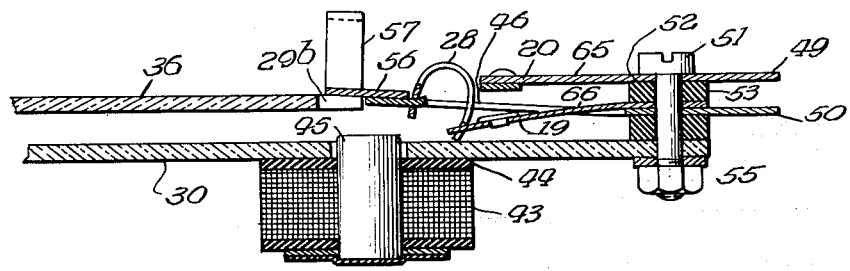
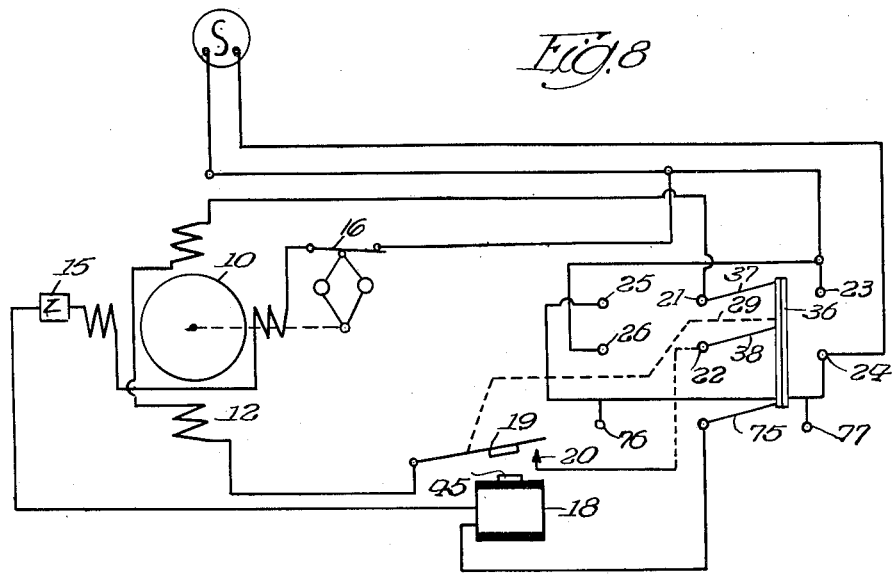

Patented Apr. 29, 1952

2,594,658

UNITED STATES PATENT OFFICE 2,594,658

INDUCTION MOTOR CONTROL SWITCH AND CIRCUIT

John C. Koonz, Fort Wayne, Ind., assignor to The Magnavox Company, Fort Wayne, Ind., a corporation of Delaware Application July 23, 1947, Serial No. 762,927

5 Claims. (Cl. 318—207)

The invention herein disclosed is a novel control switch and circuit for reversing a single-phase induction motor of the type having an auxiliary starting winding.

In my co-pending application, Serial No. 752,431, entitled "Control Switch and Circuit for Induction Motors," filed in the United States Patent Office on June 4, 1947, and assigned to the same assignee as the present application and invention, there is disclosed and claimed a basically novel control switch and circuit for readily and easily reversing a split-phase induction motor. Reference is made to that application for a statement of the problem solved by the basic invention therein generically claimed and other forms of the invention herein specifically disclosed and claimed. In my co-pending application there are illustrated and described a novel control switch and a novel circuit which include, among other features, phase-shifting means coupled to the starting winding, an oscillating type of control switch, mechanical spring stabilizing means, or the like, for keeping the running winding circuit contacts closed when the motor is running, and electromagnetic means in series with the starting winding for closing those contacts.

It is the principal object of the invention to provide an alternative control means, in or in conjunction with a single-phase motor, which means responds to one operation for reversing the motor.

A further object is to provide a convenient, fast, safe and sure control switch and circuit, particularly suitable for operation in conjunction with a timer or other automatic mechanism of the type which rotates in one direction, for starting, stopping or reversing a split-phase motor.

A further object is to provide, for reversing a split-phase motor having a speed-responsively controlled starting winding, a solenoid-actuated snap-action switch having contacts in such circuit relationship to the running winding that the running winding is energized only when they are closed, the winding of the solenoid being so arranged that it is energized to close those contacts when the starting winding is energized, whereby the motor runs in one direction, operative means for opening said contacts whereby the motor slows down, and means controlled by the operative means for shifting the phase relationship of the currents in the running and starting winding, whereby the motor slows down sufficiently to cause the speed-responsive means to energize the starting winding, the solenoid winding is energized to close those said contacts and to energize the running winding, the motor thereupon running in the reverse direction.

It is also an object of the invention to provide, in or in conjunction with a split-phase motor, a novel switch comprising means for shifting phase relationship of the windings, electroresponsive means for coupling the running winding to its energizing source and normally unidirectionally operative but reversible means having a plurality of sets or any desired combination of three kinds of positions:

First, in which it causes currents of one phase to flow in one of the windings and permits the electromagnetic or electroresponsive means to couple the main winding to its energizing source, whereby the motor runs in one direction;

Second, in which it uncouples the starting winding from its source and interacts with the electromagnetic means to uncouple the main winding from its energizing source, whereby the motor is deenergized; and Third, in which it causes a shift in phase relationship of the windings and permits the electromagnetic means to couple the main winding to its energy source, whereby the motor runs in the opposite direction.

A further object of the invention is to provide, in such a device, electroresponsive means for keeping the running winding contacts closed when the motor is running.

A further object of the invention is to provide, for use with a motor of the character described, the combination of an electroresponsive or electromagnetic device in such parallel circuit relationship with the starting winding that it is energized only when the starting winding is energized, and contacts controlled by the electromagnetic device and in such circuit relationship with the running winding that such contacts are closed when the electromagnetic device is energized, whereby the running winding is not normally energized until the starting winding is first energized.

Other and further objects and capabilities of the invention will be apparent from the following description of the accompanying drawings, in which there are illustrated preferred embodiments of switch and control circuit in accordance with the invention.

In the drawings:

Figs. 1, 2 and 3 are, respectively, perspective top and end views of the novel unidirectionally operative but reversible control switch, provided in accordance with the invention, for readily and quickly starting, stopping or reversing a split-phase motor, the switch parts being shown in a position assumed when the motor is running in one direction;

Fig. 4 is a top view of the novel unidirectionally operative but reversible control switch shown in Figs. 1, 2 and 3 (with wipers 37b, 38a omitted) in conjunction with a circuit generally similar to that shown in my said co-pending application, the circuit illustrated in Fig. 4 differing from the circuit of my co-pending application in that the solenoid 43 is electrically in parallel with the starting winding rather than in series, in accordance with a feature of the invention;

Fig. 5 is a novel control circuit which differs from the corresponding circuit shown in my copending application in that electroresponsive means is provided for keeping contacts 19, 20 closed when the main winding is energized, in accordance with another feature of the invention;

Fig. 6 is an enlarged elevational sectional view of the switch contact assembly illustrated in Figs. 1 through 4, as taken on line 6—6, Fig. 2;

Figure 1:
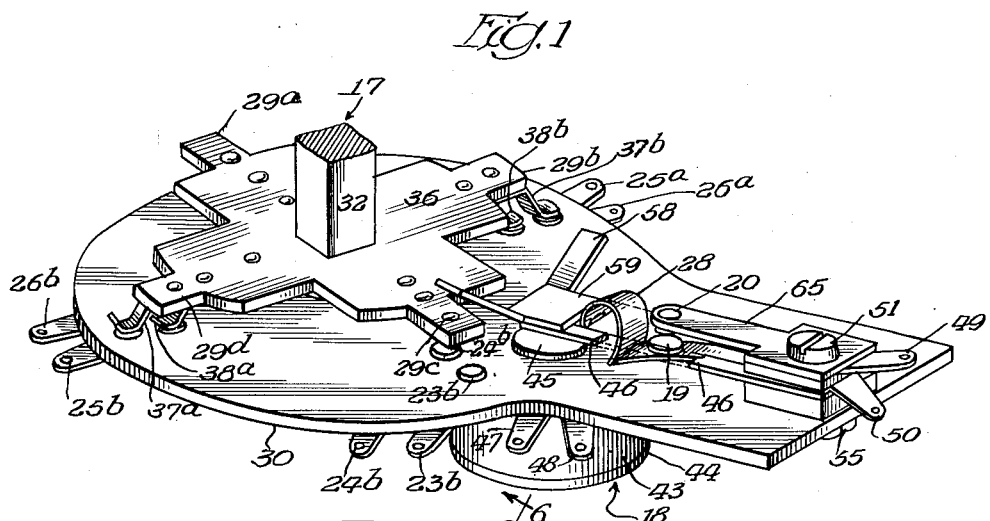
Figure 2:
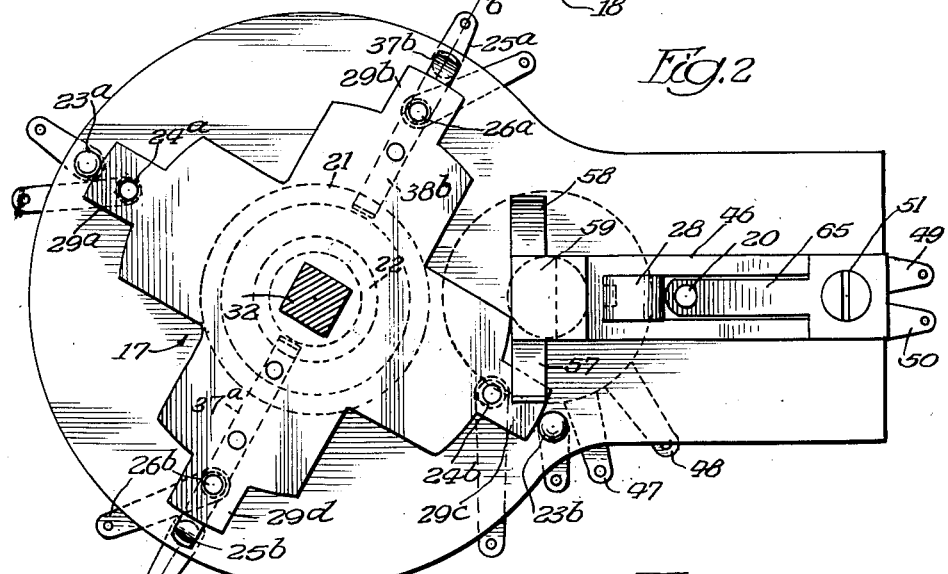

Fig. 7 is an enlarged elevational sectional view taken through the longitudinal of the armature 46 when member 36 is positioned to open contacts 19, 20;

Fig. 8 is a novel form of control circuit for readily starting, stopping and reversing a split-phase motor, showing the phase shifting means coupled to the main winding, in accordance with another feature of the invention.

Referring now specifically to Fig. 4, there are symbolically illustrated the main running winding 12 and the auxiliary starting winding 14 of a single-phase induction motor. It will be noted that windings 12, 14 are shown in space quadrature. The starting winding is shown in series with an impedance Z, numbered 15, intended to designate any arrangement whereby a time-phase-displacement between the currents flowing in windings 12, 14 is obtained. Z may consist of a resistance in series with the starting winding (in a resistance-start motor) or a capacitor in series with the starting winding (in a capacitor-start motor). Other expedients for obtaining the required time-phase-displacement may be used, such as employing high resistance or small guage wire for the auxiliary winding or inserting a reactance in series with the main winding (in the case of a reactance-start motor). The components 12, 14 and 15 are intended to designate the windings and time-phase shifter of any conventional split-phase induction motor. Such motors are per se well known to the art.

The starting winding is in series with the circuit making-and-breaking contacts of a speed-responsive device or centrifugal governor 16. Such governors are also well known to the art. This governor operates in conjunction with the rotor to cut out the starting winding (i. e. to uncouple it from its energy source) when the rotor attains a predetermined speed, say 75% to 80% of operating speed. When the rotor falls below that speed the starting winding is again cut in and energized. It will be seen that, when such a motor is running at operating speed, a mere reversal of the starting-winding leads of a prior-art motor circuit accomplishes nothing, that winding being dead both before and after reversal of the leads. Nor would reversal of the running winding leads cause motor reversal. Further, the main winding would still be energized and the motor would continue to run in the same direction.

In accordance with the basic invention shown in my above-mentioned co-pending application, there are provided broadly a novel combination of a phase-shifting switch 17 and other features required for obtaining the desired motor control. The starting winding 14 is electrically arranged in series with contacts 21 and 22 of switch 17 (Fig. 4). This switch is electrically equivalent to a double-pole, double-throw switch. Its function is to reverse or shift the phase of the currents flowing in the starting winding, as desired.

The form of phase-reversing switch herein shown and provided in accordance with the present invention comprises electrically interconnected contacts 23a, 23b (hereinafter collectively referred to by numeral 23), electrically interconnected contacts 24a, 24b (referred to as 24), electrically interconnected contacts 25a, 25b (referred to as 25) and electrically interconnected contacts 26a, 26b (referred to as 26). Contacts 25 are electrically interconnected to contacts 24. Contacts 26 are electrically conductively connected to contacts 23. It will be seen that when operative means or member 36 is in one of its four main positions (Figs. 4, 6) contacts 22 and 25a, 25b are electrically closed, contacts 21 and 26a, 26b are electrically closed, and currents of a certain phase with respect to the running winding 12 flow in the starting winding 14. When member 36 is turned clockwise to its next main position contacts 21 and 24a, 24b are closed, contacts 22 and 23a, 23b are closed and currents of shifted phase flow in starting winding 14. When member 36 is turned clockwise to the third position contacts 22 and 25 are electrically closed and contacts 21 and 26 are electrically closed and the phase of the currents flowing in starting winding 14 is again shifted. Continued movement of the switch arm 36 to the fourth position causes another phase reversal or shift. When member 36 is between any two adjacent main positions, contacts 21 and 22 are unconnected or "cold" and the starting winding 14 is deenergized.

This switch 17 constitutes phase-shifting means for the starting winding. Although the switch is reversible, it is also continuously undirectionally operative and is particularly suitable for use in conjunction with an automatic timer or the like.

The solenoid-actuated relay 18 so controls the relationship of the main winding to its energy source that the main winding 12 is energized only when the starting winding 14 is first energized. This relay is broadly provided in accordance with the invention disclosed in my co-pending application.

The exciting winding 43 of this relay is included in parallel with the starting winding 14, in accordance with the present invention, so that the relay is always energized when the starting-winding is energized. This relay, when energized, closes its contacts 19, 20 which contacts are included in circuit between the main winding 12 and source 27.

It will be noted that switch 16 cuts out the starting winding 14 as the motor approaches operating speed, deenergizing the exciting winding 43 of relay 18. In order to keep the relay contacts closed and the main winding energized until motor reversal or stopping is desired, these contacts are provided with a toggle or stabilizing means 28 (Fig. 1) to urge them closed—once they have been closed by relay 18.

The numerals 29a, 29b, 29c, 29d indicate means, presently to be described, whereby the relay contacts are mechanically opened whenever the phase of the currents flowing in the starting winding is to be shifted or reversed or whenever the motor is stopped by operation of member 36. The relay contacts and the stabilizing means 28 have such action that the contacts 19—20 are then urged apart, once opened, but they are closed, of course, when relay 18 is energized.

The operation of the Fig. 4 embodiment is now described. When motor operation in one direction is to be obtained, member 36 is turned to, say, the Fig. 4, 6 position, electrically closing contacts 22 on 25 and 21 on 26. The contacts of switch 16 have already been closed because the rotor is at rest. The starting winding 14 and relay 18 are energized. The relay contacts are closed. The main winding 12 is energized and the motor starts. As the motor approaches operating sped, switch 16 opens, deenergizing the starting winding 14 and relay 18. The relay contacts remain closed, by reason of the action of toggle 28. The motor continues to run. This is accomplished by one operation of member 36.

If the motor is to be stopped, member 36 is turned clockwise, say, toward the next main position whereby means 29b, presently to be described, opens the relay contacts. Both main and starting windings are deenergized and the motor stops. If the motor is to be reversed, member 36 is turned completely to that next main position. No matter how rapidly or slowly this operation is performed, the desired ready reversal is obtained. While member 36 is being turned, means 29b opens the relay contacts 19, 20 deenergizing the main winding 12. Spring means 28 keeps the relay contacts open and the motor slows down until centrifugal governor 16 closes its own contacts. As the switch arm reaches said next position contact 22 closes on contacts 23 and contact 21 closes on contacts 24, shifting the phase of the current in the starting winding 14. When the motor slows down to the speed at which governor 16 closes its own contacts, the starting winding 14 and relay 18 are energized. The relay contacts then close and the main winding is also energized. Since the phase of the currents in starting winding 14 has been shifted or reversed, the motor starts and runs in the opposite direction. If the motor is then to be stopped, arm 36 is again turned part way toward the next main position whereby means 29a opens the relay contacts.

If the motor is again to be reversed, the member 36 is turned to the next or third position. It will be seen that this circuit and switch provide a device whereby, by unidirectional rotary control operations, a split-phase motor can be started, stopped or reversed in any desired sequence.

The Fig. 4 embodiment differs from that shown in my said copending application primarily in two respects: First, in that the winding of relay 18 is connected in parallel with the starting winding 14; and, second, in that the switch 17, although reversible, is adapted to be turned in the same direction.

The switch 17 and the relay 18 are mounted on a fan-shaped insulating base 30. Switch 17 comprises a shaft 32 mounted for rotation on base 30. It will be understood that shaft 32 may be manually controlled or rotated by a timer or other automatic mechanism.

Securely mounted on shaft 32 is an operating member 36, formed in the general shape of a cross having four arms each terminating in an integral extension 29a, 29b, 29c or 29d. Shaft 32 and member 36 are the operative means adapted to be rotated between the main phase-determining positions. Between any two main phase-determining positions is an intermediate "off position." When member 36 is at any one of the four off positions, the main winding is deenergized.

Rigidly secured to the base 30 (Figs. 4 and 6) are circular conductive metallic contact washers 21 and 22, each concentric with shaft 32, contact 21 having the larger diameter. Rigidly secured to two opposed arms of member 36 are a pair of conductive metallic wipers 37a and 37b (referred to collectively as 37) and a pair of conductive metallic wipers 38a and 38b (referred to collectively as 38). Each of the last-mentioned wipers is insulated from the corresponding one of the first-mentioned wipers. The wipers 37a and 37b are preferably aligned on 32 and the wipers 38a and 38b are similarly aligned. The radially inner ends of wipers 37a and 37b are always in contact with contact 22 and the radially inner ends of wipers 38a, 38b are always in contact with contact 21. The outer ends of wipers 37a, 37b are in contact with contacts 25b, 25a, respectively, when member 36 is in the position shown in Figs. 4 and 6, in contact with contacts 23a and 23b, respectively, when member 36 is turned clockwise approximately through quarter turn, in contact with contacts 25a and 25b when member 36 is rotated clockwise through still another quarter turn and in contact with contacts 23b and 23a when member 36 is turned to its fourth main position. Similarly, the outer ends of wipers 38a, 38b successively contact contacts 26b—26a, 24a—24b, 26a—26b and 24b—24a. As will be seen by an inspection of Fig. 4, the wipers 37 and 38 are in open circuit relationship with respect to the several contacts 23, 24, 25 and 26 whenever the member 36 is in any of its intermediate positions.

Contacts 23a, 25a, 23b, and 25b are positioned ninety degrees apart on base 30. Contacts 24a, 26a, 24b, and 26b are also positioned 90° apart but at a lesser radial distance from shaft 32 than the first-mentioned four contacts. These contacts may be provided with integral conductive terminal tabs and are secured to the upper face of the base 30 in any suitable manner, as by riveting. Contacts 21 and 22 are also preferably provided with such tabs and secured to the upper face of the base as by riveting. Wipers 37a, 37b and 38a, 38b are secured to the lower face of the member 36 and have such shapes and spring action as always to remain in electrical conductive relation and contact with contacts 22, 21, respectively.

The relay is described in detail in my said copending patent application. The exciting winding 43 of the relay is preferably mounted on a bobbin 44, rigidly secured as by bonding to the under side of base 30. The magnetized core 45 of the relay extends through an aperture in the base with its face in proximity to an armature 46, made of resilient magnetic material. The winding leads are brought out to terminals 47, 48, riveted to the base 30. Armature 46 is shown in Fig. 1, with its central portion broken away, for purposes of clarity.

Switch contact 20 is mounted on a relatively thick rigid metallic blade 65 having an integral terminal tab 49. Contact 19 is mounted on a metallic spring blade 66 having an integral terminal tab 50. A threaded screw 51 and insulating sleeve 52 project through apertures in the fixed ends of these blades and armature 46, and through insulating washers 53 and 54, whereby the blades are secured in spaced relation to base 30, as by a lock nut 55.

Figure 3:
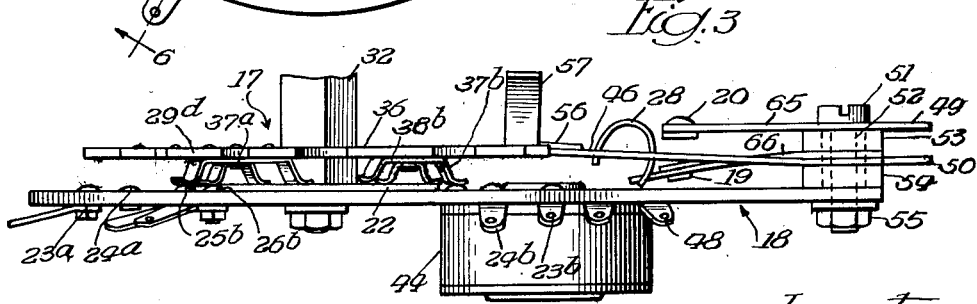

Armature 46 is mounted as a cantilever between the fixed end of blade 66 and washer 54 (Fig. 3). The armature is formed with a longitudinal slot through which the free portion of blade 66 may pass when that blade flexes. Secured to the top of the free end of the armature is a T-shaped lifter head 56. An arcuate toggle spring 28 is mounted with its ends slotted and fitting over integral lugs, extending from armature 46 and blade 66, respectively.

The operation of the relay-controlled switch contacts just described is such that when relay 18 is energized, core 45 attracts the armature 46, toggle spring 28 then causing contact 19 to snap upwardly into contact with contact 20. On the other hand, when lifter head 56 is elevated contact 19 makes a quick break with respect to contact 20. Contacts 19 and 20 stay open or closed, as the case may be, until armature 46 is depressed by relay 18 or until lifter head 56 is elevated. Switch elements 46, 28, 19, 20, 65, 66, 51, 52, 53, 54 and 55 function as a snap-action switch for controlling the opening and closing of the main winding circuit. These elements are fully described in my said co-pending patent application. Elements 32, 36, 37a, 37b, 38a, 38b, 21, 22, 23a, 23b, 24a, 24b, 25a, 25b and 26a, 26b function as a rotatable but reversible phase-shifting switch for coupling the starting winding 14 to source 27 with either phase desired (when the member 36 is in its four main positions) or for uncoupling the starting winding from the source (when the member 36 is in its intermediate off positions).

The means for uncoupling the main winding 12 from its source by breaking contacts 19, 20 during the phase-shifting operation comprises the integral projections or cams 29a, 29b, 29c and 29d on member 36. Lifter head 56 is formed with upwardly and laterally extending wings 57 and 58 and a central flat portion 59. When any projection 29a, 29b, 29c or 29d passes under portion 59, as the member 36 is turned from one main position to another, head 56 and armature 46 are lifted by the projection breaking contacts 19, 20, as best shown in Figs. 1 and 3. Those figures show the conditions which exist when the switch 17 has been operated to reverse the motor but when the motor has not yet slowed down sufficiently to close switch 16.

Let it be assumed that shaft 32 and member 36 are in the Fig. 4 position. Then the following events occur:

(1) The starting winding is energized through the following circuit elements: 61, 26a, 38b, 21, 48, 14, 16, 22, 37a, 25b, 24b, 62;

(2) The relay 18 is energized through the following circuit elements: 61, 26a, 38b, 21, 48, 47, 16, 22, 37a, 25b, 24b, 62;

(3) The contacts 19, 20 close;

(4) The main winding 12 is energized through the following circuit elements: 61, 12, 50, 66, 19, 20, 65, 49, 25b, 24b, 62;

(5) The motor runs in one direction;

(6) Switch 16 opens and the motor continues to run.

When the shaft 32 and the member 36 are turned clockwise to an off position these events occur;

(1) Wiper 37a leaves contact 25b, wiper 37b leaves contact 25a, wiper 38a leaves contact 26b and wiper 38b leaves contact 26a;

(2) Projection 29b causes contacts 19, 20 to be broken;

(3) The main winding 12 and the starting winding 14 being deenergized, the motor slows down;

(4) Switch 16 re-closes;

(5) The motor stops.

When the shaft 32 and member 36 are turned to their next position, these events occur:

(1) The starting winding is energized through the circuit: 61, 23a, 37a, 22, 16, 14, 48, 21, 38b, 24b, 62;

(2) The relay winding is energized through the circuit: 61, 23a, 37a, 22, 16, 47, 48, 21, 38b, 24b, 62;

(3) Contacts 19, 20 close;

(4) The main winding 12 is energized through the circuit: 61, 12, 50, 66, 19, 20, 65, 49, 25b, 24b, 62;

(5) The motor runs in the opposite direction;

(6) Switch 16 opens and the motor continues to run.

The direction of rotation of the motor may be controlled by the simple expedient of turning shaft 32.

When the member 36 is rotated to the third position, the circuits are as follows:

*Starting winding.*—61, 26b, 38b, 21, 48, 14, 16, 22, 37a, 25a, 25b, 24b, 62;

*Relay winding.*—61, 26b, 38b, 21, 48, 47, 16, 22, 37a, 25a, 24b, 62;

*Main winding.*—61, 12, 50, 66, 19, 20, 65, 49, 25b, 24b, 62.

When the member 36 is rotated to the fourth position, the circuits are as follows:

*Starting winding.*—61, 23b, 37a, 22, 16, 14, 48, 21, 38b, 24a, 24b, 62;

*Relay winding.*—61, 23b, 37a, 22, 16, 47, 48, 21, 38b, 24a, 62;

*Main winding.*—61, 12, 50, 66, 19, 20, 65, 49, 25b, 24b, 62.

In the Figs. 1–4, 6, 7, embodiment the spring 28 has been used as a stabilizing means for urging contacts 19—20 closed (when initially closed by solenoid 43) and for urging contacts 19—20 open (when initially opened by one of the cams 29). In the Fig. 5 embodiment the spring 28 may be omitted and the contacts 19—20 may be so arranged (by means well known to those skilled in the art, as by a tension spring 71, for example) as to be normally open. Once closed by solenoid 43, however, contacts 19—20 are kept closed by the magnetic effects of a winding 70, until the contacts 19—20 are opened by one of the cams 29a, 29b, 29c or 29d.

Specifically, the relay has an additional winding 70 in series with the main winding and with contacts 19—20. The winding 70 is energized when contacts 19—20 are closed. Its function, then, of this winding is to keep contacts 19—20 closed when the motor starts.

In other respects the Fig. 5 circuit is the same as that illustrated in my co-pending patent application and the same references numerals are used on the common elements. Spring 71 and winding 70 perform the same functions as toggle spring 28 shown in Fig. 1 herein. It is obvious that one of the contacts 19 or 20 could be associated with a permanent magnet for performing the function of winding 70 and armature 45.

In the illustrative Fig. 5 embodiment shown, the starting winding 14 (therefore the phase of the currents in coil 43 relative to that in coil 70) is reversed when the direction of motor rotation is reversed. It will be apparent then that coils 70 and 43 will buck each other when the motor is running in one direction. These coils can be unbalanced so that the net magnetic flux will pass zero when the switch 16 opens, by methods well known to those skilled in the art.

The operation of the Fig. 5 system is generally similar to that of the Fig. 4 system. When member 36 is turned from one main position toward another main position, for example, one of the cams 29a, 29b, 29c, 29d first opens contacts 19, 20 deenergizing coil 70. As member 36 reaches that next position, the starting winding and coil 43 are energized, closing contacts 19—20. The main winding is energized and the motor starts. The magnetic effects of coil 43 (which predominate over those of coil 70 when these two coils are bucking each other) keep contacts 19—20 closed until switch 16 opens. Then the magnetic effects of coil 70 keep those contacts closed while the motor continues to run.

The Fig. 8 embodiment utilizes the phase-shifting means to shift the phase of the currents in the running winding rather than those in the starting winding. Like elements are designated by like reference numerals in all of the figures, so that specific description of the Fig. 8 elements, other than the phase-shifting switch, is not necessary.

One side of the supply line is connected to the interconnected terminals 23a, 23b, 26a, 26b. The other side of the supply line is connected to the interconnected terminals 24a, 24b, 25a, 25b. The phase of the currents through the terminals 21, 22 is shifted when the switch member 36 is moved from one position to the next. Between main switch positions, these terminals are "cold." The running winding 12 and contacts 19, 20 are serially arranged with respect to these terminals, so that the running winding leads are effectively reversed when the member 36 is turned from one position to the next, the running winding being deenergized during the phase-shifting operation.

The starting winding 14 is arranged in series with switch 16, impedance 15, the winding 43 of relay 18 and a third switch wiper 75, adapted to close on contact 76 or contact 77 when member 36 is in one of its main positions. One side of the line is connected to contacts 76, 77, 24 and the other side is connected to switch 16, whereby the starting winding 14 and the relay 18 are energized to close contacts 19, 20, and permit the main winding to be energized only when member 36 is in one of its main positions and when centrifugal switch 16 closes. The operation of this circuit will be apparent from the foregoing description of the Figs. 4 and 5 circuits, the main difference residing in the fact that in the Fig. 8 circuit, motor reversal is obtained by shifting the phase of the currents in the main winding rather than the starting winding.

It will be apparent from the foregoing description that various substitutions of equivalents and modifications may be made without departing from the true scope of the invention. For example, one of each set of switch wipers 37, 38 can be omitted, as shown in Fig. 4. Further, the switch contacts on base 39 can be so arranged that as the member 36 is rotated from one position to the next, the motor will be shut off and again operated in the same direction. In the latter case, one of the cams 29a, 29b, 29c or 29d could be deleted, so that certain changes of position of member 36 would have no effect on the direction of operation of the motor and the order of the contacts 23, 24, 25 and 26 could be modified as desired. It is intended in the appended claims to cover all such changes and modifications as fall within the true scope of the invention.

I claim:

1. A control device for reversing a single-phase inducton motor of the type having a main running winding and an auxiliary starting winding and a speed-responsive device for disconnecting the auxiliary winding from its source comprising, in combination, a base member, a phase reversing switch for one of the windings consisting of a member mounted for unlimited rotary movement on said base member and a plurality of conductive wipers secured to the arm and conductive contacts secured to the base, said contacts and wipers and associated connections being so arranged that the rotary switch has a plurality of kinds of operative positions, one in which it causes currents of one phase to flow in said one winding, another in which it uncouples said one winding from its source, and still another kind of position in which it causes currents of shifted polarity to flow in said one winding, a snap-action switch mounted on the base and having contacts electrically in series circuit between the main winding and its source, a solenoid mounted on the base and having an exciting winding in circuit relationship to the auxiliary winding whereby the solenoid is energized to close said contacts thereby to energize the running winding when the auxiliary winding is energized, and a plurality of cam means on said rotatably mounted member for opening the contacts of said snap-action switch, whereby when said arm is rotated between any two positions said main winding is deenergized to permit said motor to slow down to such a degree that the speed-responsive means connects the starting winding to its source.

2. A control device for reversing a single-phase induction motor of the type having a main running winding and an auxiliary starting winding and a speed-responsive device for disconnecting said auxiliary windings from its source of potential comprising, in combination, a base member, a phase-reversing switch rotor rotatably mounted on said base, contacts mounted concentrically with said rotor and connected to one of said windings, wipers positioned on said rotor and engaging said concentric contacts, pairs of contacts mounted on said base in the paths of movement of said wipers and connected to said source of potential, the contacts of certain pairs being connected to said source in opposite polarity for reversing the connection of said source to said one winding, a switch mounted on said base adjacent to said rotor and connected to the other of said windings, means operatively associated with said rotor for engaging said switch and opening it when said rotor is operated, and electro-responsive means mounted on said base in operative relation to said switch and connected to said one winding for closing said switch when said speed-responsive device connects said one winding.

3. A control device for reversing a single-phase induction motor of the type having a main running winding and an auxiliary starting winding and a speed-responsive device for disconnecting said auxiliary windings from its source of potential comprising, in combination, a base member, a phase-reversing switch rotor rotatably mounted on said base, contacts mounted concentrically with said rotor and connected to one of said windings, pairs of wipers positioned on said rotor and engaging said concentric contacts, an extension on said rotor adjacent each of said pairs of wipers, pairs of contacts mounted on said base in the paths of movement of said wipers and connected to said source of potential, the contacts of alternate pairs being connected to said source in opposite polarity for reversing the connection of said source to said one winding, a switch mounted on said base adjacent to said rotor in the path of said extensions to be opened thereby when said rotor is rotated and connected to the other of said windings, and electro-responsive means mounted on said base in operative relation to said switch and connected to said one winding for closing said switch when said speed-responsive device connects said one winding.

4. A control device for reversing a single-phase induction motor of the type having a main running winding and an auxiliary starting winding and a speed-responsive device for disconnecting said auxiliary starting windings from its source of potential comprising, in combination, a base member, a phase-reversing switch rotor rotatably mounted on said base, contacts mounted concentrically with said rotor and connected to one of said windings, pairs of wipers positioned on said rotor and engaging said concentric contacts, an extension on said rotor adjacent each of said pairs of wipers, pairs of contacts mounted on said base in the paths of movement of said wipers, one contact of each pair being connected to one side of said source of potential, the other contact of each pair being connected to the other side of said source of potential, the contacts of alternate pairs being connected to said source in opposite polarity for reversing the connection of said source to said one winding, a switch mounted on said base adjacent to said rotor in the path of said extensions to be opened thereby when said rotor is rotated and connected to the other of said windings, and a solenoid mounted on said base in operative relation to said switch and connected to said one winding for closing said switch when said speed-responsive device connects said one winding.

5. A control device for reversing a single-phase induction motor of the type having a main running winding and an auxiliary starting winding and a speed-responsive device for disconnecting said auxiliary starting winding from its source of potential comprising, in combination, a base member, a phase-reversing switch rotor rotatably mounted on said base, a pair of slip rings mounted concentrically with said rotor and connected to one of said windings, sets of pairs of wipers positioned on said rotor diametrically opposite to one another with respect to said slip rings and engaging said slip rings, a cam on said rotor adjacent each of said pairs of wipers, sets of diametrically opposed pairs of contacts mounted on said base in the paths of movement of said wipers, one contact of each opposed pair being connected to one side of said source of potential, the other contact of each opposed pair being connected to the other side of said source of potential, the contacts of alternate sets of pairs being connected to said source in opposite polarity for reversing the connection of said source to said one winding, a snap-action switch mounted on said base adjacent to said rotor in the path of said cams to be opened thereby when said rotor is rotated and connected to the other of said windings, and a solenoid mounted on said base in operative relation to said switch and connected to said one winding for closing said switch when said speed-responsive device connects said one winding.

JOHN C. KOONZ.

REFERENCES CITED

The following references are of record in the file of this patent:

UNITED STATES PATENTS

| Number | Name | Date |
| --- | --- | --- |
| 1,316,009 | Weber | Sept. 16, 1919 |
| 1,576,276 | Hedges et al. | Mar. 9, 1926 |
| 2,320,176 | Dunham et al. | May 25, 1943 |
| 2,382,827 | Sprague et al. | Aug. 14, 1945 |
| 2,388,382 | Brongersma | Nov. 6, 1945 |
| 2,459,479 | Weinland | Jan. 18, 1949 |